United States Patent Office
2,852,520
Patented Sept. 16, 1958

2,852,520

TRIALKOXYBENZOYLOXYALKYL DERIVATIVES RELATED TO NORHARMAN

Richard A. Robinson, Evanston, Ill., assignor to G. D. Searle & Co., Chicago, Ill., a corporation of Delaware No Drawing. Application January 8, 1957
Serial No. 632,964

12 Claims. (Cl. 260—295)

The present invention is concerned with 3,4,5-trialkoxybenzoic acid esters of 2-(hydroxyalkyl)-9-pyrid [3.4-b]-indole, with alkyl substitution products and polyhydro derivatives thereof, and with non-toxic, acid-addition salts and quaternary ammonium salts related thereto.

Specifically, the compounds of the present invention include the organic bases of the structural formula

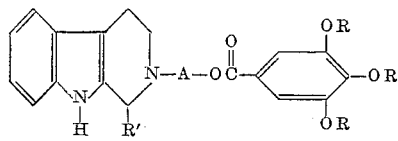

the acid-addition salts and quaternary ammonium salts of the structural formula

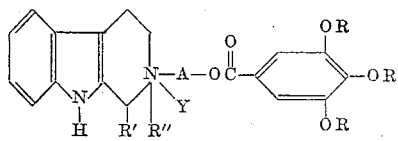

and the quaternary ammonium salts of the structural formula

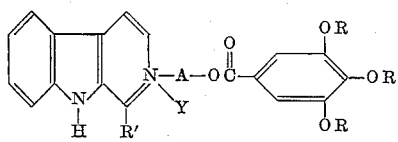

In these formulas R represents a lower alkyl radical, R' represents hydrogen or a lower alkyl radical, and R" represents hydrogen or a lower alkyl radical. Embodiments of R, R', and R" can be selected from among such lower alkyl radicals as methyl, ethyl, propyl, butyl, amyl, hexyl, heptyl, octyl and branched-chain isomers thereof. In the foregoing formulas Y represents a non-toxic anion, and A represents a lower alkylene radical separating the groups attached thereto by at least 2 carbon atoms. A can therefore represent a polymethylene radical such as ethylene, trimethylene, tetramethylene, pentamethylene or hexamethylene, or it can represent one of the radicals isomeric therewith, such as a propylene, butylene, amylene, or hexylene radical, subject to the limitation that at least 2 carbon atoms are interposed between the groups attached to the alkylene radical.

The compounds of the present invention are structurally related to the ring system 9-pyrid[3.4-b] indole, alternatively known as norharman or β-carboline.

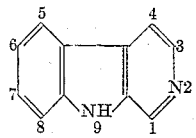

In the manufacture of those compounds of this invention which have a fully aromatic ring system, good results are obtained by heating norharman, or a 1-alkyl derivative of norharman, with a haloalkyl ester of a 3,4,5-trialkoxybenzoic acid. The reaction proceeds fairly rapidly at temperatures somewhat in excess of 100° C., although it can also be carried out at lower temperatures by employing longer reaction times. Upon crystallization of the reaction mass, the desired quaternary ammonium salt results.

In the manufacture of the partially hydrogenated compounds of this invention, good results are obtained by heating 1,2,3,4-tetrahydronorharman, or a 1-alkyl substitution product thereof, with a haloalkyl ester of a 3,4,5-trialkoxybenzoic acid. The reaction can be carried out by reflux in an alcoholic or ketonic solution. When the reaction is carried out with a large excess of tetrahydronorharman, or one of its alkyl derivatives, the hydrogen halide formed in the reaction is principally consumed in the formation of tetrahydronorharman hydrohalide (or an alkyl substitution product thereof), and the desired reaction product is isolated as the free base. Unreacted tetrahydronorharman and its homologs can also be precipitated from ethereal solution by the addition of carbon disulfide.

The haloalkyl esters of 3,4,5-trialkoxybenzoic acids required as starting materials can be prepared by the reaction of a 3,4,5-trialkoxybenzoyl chloride with a haloalkanol. Homologs of norharman are prepared by reacting tryptamine with an alkanoyl chloride, effecting cyclization with phosphorus oxychloride, and dehydrogenating the resulting product, as illustrated more fully in examples to follow.

The organic bases of this invention form non-toxic, acid-addition and quaternary ammonium salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. Quaternary ammonium salts can be formed by reaction of the free bases with a variety of organic esters of sulfuric, hydrohalic and aromatic sulfonic acids. The organic esters employed for quaternary ammonium salt formation are desirably lower alkyl halides and alkylene halohydrins. However, other organic esters are suitable for salt formation, and can be selected from among a diverse class of compounds including benzyl chloride, phenethyl chloride, naphthylmethyl chloride, dimethyl sulfate, methyl benzenesulfonate, ethyl toluene-sulfonate, allyl chloride, methallyl bromide and crotyl bromide. For purposes of this invention the free bases are equivalent to their non-toxic acid-addition and quaternary ammonium salts.

The compounds of this invention have useful pharmacological properties. They are depressants of the central nervous system, and upon administration they produce a state of tranquility which is desirable in the treatment of conditions characterized by mental agitation. These compounds also are effective in reducing gastric acidity, and are anti-hypertensive agents.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.), distillation pressures in millimeters (mm.) of mercury, and quantities of materials in parts by weight.

Example 1

A solution of 25 parts of 3,4,5-trimethoxybenzoic acid and 65 parts of thionyl chloride is maintained at about 60° C. for 2 hours and is then allowed to stand at room temperature for 16 hours. The thionyl chloride is removed by distillation under reduced pressure. Small portions of benzene are added to the residue and removed by distillation under reduced pressure. A solution of the residue in 27 parts of anhydrous benzene is diluted with petroleum ether, whereupon a crystalline precipitate of 3,4,5-trimethoxybenzoyl chloride separates. This acid chloride is collected on a filter and washed with petroleum ether. A solution of 21 parts of this compound and 12.5 parts of ethylene bromohydrin in 88 parts of anhydrous benzene is heated under reflux for 7 hours and allowed to stand at room temperature for 48 hours. The reaction mixture is diluted with ether and washed with ice water, with several portions of cold, saturated sodium bicarbonate solution, and with several portions of ice water. The ethereal phase is separated, dried and concentrated in a nitrogen atmosphere. Crystallization of the residue from petroleum ether affords 2-bromoethyl 3,4,5-trimethoxybenzoate melting at about 63–65° C.

Example 2

A solution of 1.45 parts of harman and 2.12 parts of 2-bromoethyl 3,4,5-trimethoxybenzoate in 15 parts of chloroform, maintained in a nitrogen atmosphere, is slowly heated in an open reaction vessel, permitting the chloroform to be removed by vaporization, until the temperature of the residual mass is about 115° C. The mixture is then heated at about 115° C. for 2 hours, after which the cooled reaction mass, which consists of a vitreous substance, is crystallized by allowing it to stand with a small quantity of isopropyl alcohol. Upon further purification by crystallizations from methanol there is obtained 1-methyl-2-[2-(3,4,5-trimethoxybenzoyloxy)ethyl]-9-pyrid[3.4-b]indolium bromide which melts at about 235° C. and has the structural formula

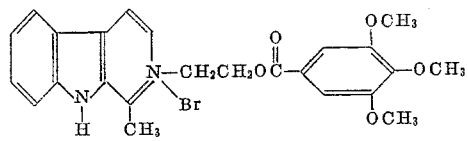

Example 3

3,4,5-triethoxybenzoic acid (20 parts) is dissolved in 65 parts of thionyl chloride, and the solution is warmed at about 60° C. for 4 hours. The thionyl chloride is then removed by distillation under reduced pressure. Small portions of benzene are added to the residue and removed by distillation under reduced pressure. The residue which remains is crystallized from a mixture of benzene and petroleum ether. A solution of 10 parts of the 3,4,5-triethoxybenzoyl chloride thus obtained and 5 parts of ethylene bromohydrin in 70 parts of anhydrous benzene is heated under reflux for 8 hours and allowed to stand at room temperature for 18 hours. Ether (210 parts) is added and the solution is washed with ice water, with several portions of cold, saturated sodium bicarbonate solution, and finally with several portions of ice water. The separated organic phase is rendered anhydrous and concentrated to dryness by vaporization of the solvents. By crystallization of the residue from petroleum ether there is obtained 2-bromoethyl 3,4,5-triethoxybenzoate, suitable for use without further purification.

Example 4

A solution of 1.2 parts of harman and 2.0 parts of 2-bromoethyl 3,4,5-triethoxybenzoate in 18 parts of chloroform is heated in an open reaction vessel until the chloroform is removed by vaporization, following which the residual mass is heated at about 120° C. for 2 hours in a nitrogen atmosphere. The cooled reaction mass is crystallized from isopropyl alcohol, and the product is collected on a filter. This compound is 1-methyl-2-[2-(3,4,5-triethoxybenzoyloxy)ethyl] - 9 - pyrid[3.4-b]indolium bromide which shows ultraviolet absorption maxima at about 254 and 308 millimicrons, and has the structural formula

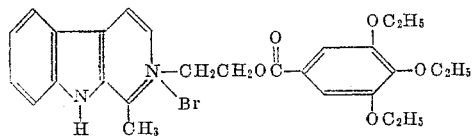

Example 5

A solution of 65 parts of 3,4,5-trimethoxybenzoic acid, 300 parts of chloroform and 65 parts of thionyl chloride is heated under reflux for 3 hours. The cooled solution is diluted with 425 parts of ether and washed with several portions of cold water and with dilute potassium carbonate solution, after which the separated ether-chloroform solution is rendered anhydrous and distilled at a pressure of about 20–30 mm. until only a crystalline residue remains. This crystalline residue, which amounts to about 72 parts and is 3,4,5-trimethoxybenzoyl chloride, is dissolved in 150 parts of chloroform. 3-bromo-1-propanol (42 parts) is added, and the mixture is heated externally with steam for 3 hours, at such a rate that substantially all of the chloroform is removed by distillation during this period. Hydrogen chloride is rapidly evolved, and most of the hydrogen chloride which remains after the heating period is expelled by passing a stream of nitrogen through the cooled, oily product. The remaining product is then submitted to a fractional distillation under reduced pressure. Unreacted 3-bromo-1-propanol is collected as a distillate at about 80–100° C. at 15 mm. The distillation pressure is then lowered to about 0.15 mm., and after other lower boiling materials are removed, a distillate of the desired product, boiling point about 165–167° C. at 0.15 mm., is collected. This fraction amounts to about 53 parts, and tends to crystallize upon cooling. By recrystallization from ether there is obtained purified 3-bromopropyl 3,4,5-trimethoxybenzoate which melts at about 65–67° C. and has the structural formula

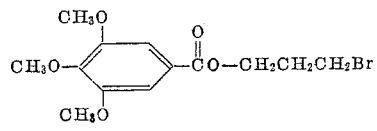

Example 6

An intimate mixture of 1.7 parts of norharman and 2.33 parts of 3-bromopropyl 3,4,5-trimethoxybenzoate is heated in a nitrogen atmosphere at about 120° C. for 20 minutes. The cooled reaction mass is dissolved in chloroform, and the product is precipitated by the addition of anhydrous ether. This product is collected on a filter and washed with ether and with acetone. Upon recrystallization from isopropyl alcohol, there is obtained 2-[3-(3,4,5 - trimethoxybenzoyloxy)propyl]-9-pyrid[3.4-b]indolium bromide which melts at about 204–205° C. and has the structural formula

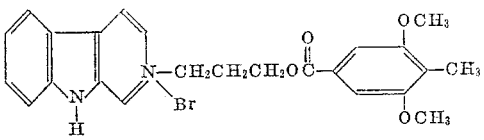

Example 7

1,2,3,4-tetrahydronorharman (5.2 parts) is dissolved in 240 parts of hot acetone. 2-bromoethyl 3,4,5-trimethoxybenzoate (4.82 parts) is added, and the mixture is heated under reflux for 3 hours. The cooled mixture is filtered from a crystalline precipitate comprising principally tetrahydronorharman hydrobromide, and the filtrate is distilled to dryness under reduced pressure. The oily residue is crystallized from ether to afford 1,2,3,4-tetrahydro-2-[2-(3,4,5 - trimethoxybenzoyloxy)ethyl]-9-pyrid[3.4-b]indole of the structural formula

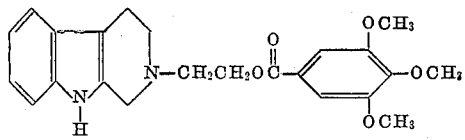

The crude, crystalline free base which is obtained is dissolved in about 60 parts of chloroform; about 150 parts of ether is added, and any material which precipitates is removed by filtration. The filtrate is treated with 2 parts of carbon disulfide, and after two hours is again filtered from precipitated material. To this filtrate is added a solution of 2 parts of oxalic acid dissolved in ether. The crystalline oxalate is collected on a filter and recrystallized from methanol to afford a product which melts at about 197° C.

A citrate is obtained by mixing solutions of equimolar quantities of the free base and citric acid in isopropyl alcohol, and concentrating the resulting mixture almost to dryness.

*Example 8*

An intimate mixture of 6.88 parts of 1,2,3,4-tetrahydronorharman and 4.66 parts of 3-bromopropyl 3,4,5-trimethoxybenzoate is heated at about 110–115° C. for 20 minutes, under which conditions the mixture becomes a viscous oil. The cooled mass is extracted with 700 parts of ether until no more will dissolve, and the ethreal solution is treated with one part of carbon disulfide. After 30 minutes a small quantity of precipitate is removed by filtration. Upon vaporization of the ether from the filtrate there is obtained a residue of 1,2,3,4-tetrahydro-2-[3-(3,4,5-trimethoxybenzoyloxy)propyl]-9-pyrid[3.4-b]indole of the structural formula

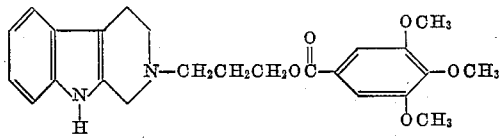

An ethereal solution of the free base is treated with a slight excess over 1 molecular equivalent of hydrogen bromide in isopropyl alcohol, and the crystalline hydrobromide which separates is collected on a filter and washed with ether and with acetone. It melts at about 211-212° C.

The hydrochloride is obtained by treating an ethereal solution of the free base with approximately 1 molecular equivalent of hydrogen chloride in isopropyl alcohol, and collecting the precipitated product.

*Example 9*

An open reaction vessel containing 18 parts of 1,2,3,4-tetrahydroharman, 11.65 parts of 3-bromopropyl 3,4,5-trimethoxybenzoate and 300 parts of chloroform is heated with a steam jacket until all of the chloroform is removed by volatilization, after which the residual mixture is maintained at about 100° C. for an additional hour. The cooled reaction mass is stirred with 520 parts of chloroform until no more will dissolve, and the solution is filtered from insoluble tetrahydroharman hydrobromide. The filtrate is brought to dryness by vaporization of the chloroform, and the non-volatile residue is extracted with 500 parts of anhydrous ether. The ethereal solution is filtered from a small quantity of insoluble matter and treated with 4 parts of carbon disulfide. By this operation unreacted tetrahydroharman is precipitated as an insoluble dithiocarbamate; when separation is complete, the precipitate is removed by filtration. Upon evaporation of the ethereal filtrate there is obtained a residue of crude 1,2,3,4-tetrahydro-1-methyl - 2 - [3 - (3,4,5 - trimethoxybenzoyloxy)propyl]-9-pyrid[3.4-b]indole of the structural formula

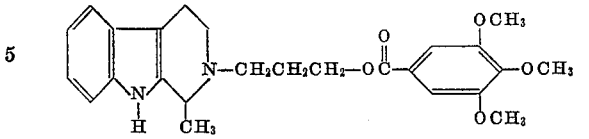

An ethereal solution of 18 parts of the crude free base is treated with a total of approximately 1 molecular equivalent of hydrogen bromide in isopropyl alcohol added in several small portions. The operation is conducted in such a manner that the fraction first precipitated (about 1–2 parts) and the fraction last precipitated (about 1–2 parts) are collected separately and discarded. Fractions intermediate between those first and last precipitated are combined and crystallized from tertiary amyl alcohol or from isoamyl alcohol. If crystallization does not proceed spontaneously within a reasonable period of time, it is desirable to obtain seed crystals by a standard method, from a small portion of the product, and use these to initiate crystallization of the remainder of the product. The hydrobromide thus obtained melts at about 200° C.

The purified hydrobromide is converted to the free base by rendering a cold, aqueous solution of the hydrobromide basic with potassium carbonate, rapidly extracting the aqueous suspension with several portions of ether, drying the ethereal extract, and removing the ether by volatilization. A solution of 2.8 parts of the free base and 0.77 part of methyl bromide in 85 parts of acetone is heated in a sealed reaction vessel at about 70–75° C. for 18 hours. The mixture is distilled to dryness, and the residue is crystallized from ether. The crude, crystalline product is dissolved in a mixture of 100 parts of water and 80 parts of methanol, and the aqueous-methanolic solution is washed with a total of 60 parts of chloroform in four equal portions. The aqueous-methanolic phase is brought to dryness by distillation under reduced pressure and the residue, after thorough drying, is recrystallized from a mixture of acetone and ether and then from acetone until the melting point is about 179–181° C. This compound is the purified methobromide.

A solution of 2.5 parts of the free base and 1.0 part of ethyl iodide in 80 parts of acetone is heated in a sealed reaction vessel at about 70° C. for 4 hours. It is then brought to dryness, and the residue is washed with ether. The compound obtained is the ethiodide.

*Example 10*

Tryptamine hydrochloride (9.8 parts) is dissolved in 100 parts of water, and a well-stirred mixture of this solution and 135 parts of benzene is treated with a concentrated, aqueous solution of 5 parts of sodium hydroxide and then, over a period of 30–45 minutes, with a total of 9 parts of octanoyl chloride. Stirring is continued for an additional 15 minutes, after which the separated benzene phase is washed with dilute hydrochloric acid, with dilute sodium hydroxide, and with water. It is then rendered anhydrous and distilled to dryness under reduced pressure. When the crystalline residue is washed with petroleum ether and with ether, there results N-octanoyltryptamine which melts at about 93–96° C. and is suitable for use without further purification. The structural formula is

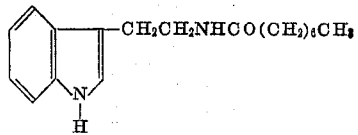

*Example 11*

A solution of 19 parts of N-octanoyltryptamine in 330 parts of phosphorus oxychloride is heated under reflux in a nitrogen atmosphere for 1 hour, following which substantially all of the phosphorus oxychloride is removed by distillation at about 20–30 mm. A solution of the oily residue in 80 parts of ethanol is rendered distinctly basic by the addition of sodium hydroxide solution, and the organic free base is precipitated by the addition of a large volume of water. The free base is extracted with ether, and the ethereal extract after being rendered anhydrous, is treated with a slight excess of maleic acid. The insoluble maleic acid salt which precipitates is collected on a filter and washed with ether and with acetone. This compound is 1-heptyl-3,4-dihydro-9-pyrid[3.4-b]indole maleate which melts at about 157–160° C. and has the structural formula

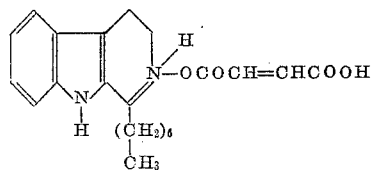

The free base is obtained by making an aqueous solution of the maleate basic with potassium carbonate, extracting with ether, and concentrating the ethereal solution to dryness. It is converted into the hydrochloride of melting point about 179–180° C. by treatment of an ethereal solution with a slight excess of hydrogen chloride in isopropyl alcohol, and recrystallizing the precipitated product from a mixture of isopropyl alcohol and butanone.

Example 12

A dehydrogenation medium is prepared by transferring 25 parts of Raney nickel catalyst of relatively high activity (or a comparable nickel catalyst) to a reaction vessel with a small quantity of benzene and adding to the catalyst, wet with benzene, 520 parts of molten naphthalene which has been freshly distilled from sodium hydroxide. To this dehydrogenation medium, maintained molten by the application of external heat, is added a solution of the free base, 1-heptyl-3,4-dihydro-9-pyrid-[3.4-b]indole, in a small quantity of benzene. (This solution of the free base is prepared by treating 10 parts of 1-heptyl-3,4-dihydro-9-pyrid[3.4-b]indole maleate in cold aqueous medium with a slight excess of sodium hydroxide, extracting the resulting free base with a mixture of ether and benzene containing about equal parts by volume of each solvent component, rendering the separated organic phase anhydrous, and concentrating it by distillation until substantially all of the ether and part of the benzene are removed.). The dehydrogenation mixture is then heated at about 195–200° C. for 3 hours, employing an air condenser to prevent excessive loss of naphthalene. The cooled mass is stirred with sufficient benzene to bring the naphthalene into solution, and the catalyst is removed by filtration. The reaction product is extracted from the filtrate with an excess of dilute sulfuric acid (containing up to about 10% methanol to facilitate solution) and the aqueous extract, which contains the sulfuric acid salt, is chilled and made basic by the addition of sodium hydroxide. The free base is extracted with ether, and the ethereal solution is washed with water, rendered anhydrous, and treated with a slight excess of hydrogen chloride in isopropyl alcohol. The precipitated product is collected and crystallized from acetone until the melting point is about 153–154° C. It is 1-heptyl-9-pyrid[3.4-b]indole hydrochloride. The structural formula of the free base is

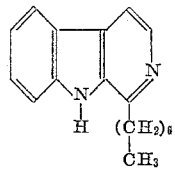

Example 13

A chilled, aqueous solution of 3 parts of 1-heptyl-9-pyrid[3.4-b]indole hydrochloride is made basic by the addition of sodium hydroxide solution, and the resultant organic base is extracted with several portions of a mixture of benzene and ether containing equal parts by volume of each solvent component. The combined organic extract is rendered anhydrous and distilled to dryness. To the oily residue is added 2.3 parts of 3-bromopropyl 3,4,5-trimethoxybenzoate, and the mixture is heated, with occasional stirring, at about 125° C. for 1 hour. The cooled reaction mass is digested with a small quantity of ether, and the crystalline product is collected on a filter. For purification it is washed by suspension in isopropyl alcohol, again collected on a filter and finally washed with isopropyl alcohol and with ether. The product as thus obtained is 1-heptyl-2-[3-(3,4,5-trimethoxybenzoyloxy) propyl]-9-pyrid[3.4-b]indolium bromide melting at about 159–161° C. This compound is difficultly soluble in water, but dissolves more readily in aqueous propylene glycol. The structural formula is

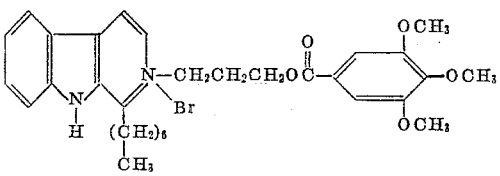

What is claimed is:

1. A member of the class consisting of salts of the structural formulas

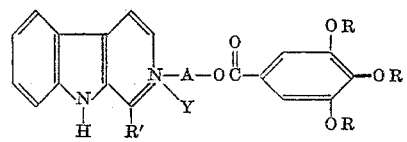

and

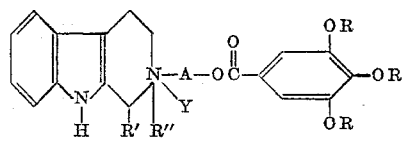

and bases of the structural formula

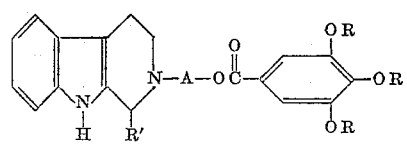

in which formula A is a lower alkylene radical separating the groups attached thereto by at least 2 carbon atoms, R is a lower alkyl radical, R' is a member of the group consisting of hydrogen and lower alkyl radicals, R" is a member of the group consisting of hydrogen and lower alkyl radicals, and Y is a non-toxic anion.

2. A compound of the structural formula

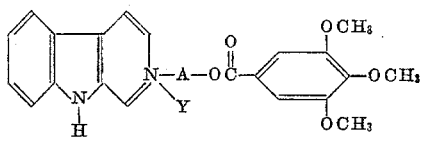

wherein A is a lower alkylene radical separating the groups attached thereto by at least 2 carbon atoms, and Y is a non-toxic anion.

3. 2 - [3 - (3,4,5 - trimethoxybenzoyloxy)propyl] - 9 - pyrid[3.4-b]indolium bromide.

4. A compound of the structural formula

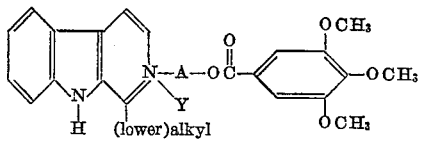

wherein A is a lower alkylene radical separating the groups attached thereto by at least 2 carbon atoms, and Y is a non-toxic anion.

5. 1 - (lower)alkyl - 2 - [2 - (3,4,5-trimethoxybenzoyloxy)ethyl]-9-pyrid[3.4-b]indolium bromide.

6. 1 - methyl - 2 - [2 - (3,4,5 - trimethoxybenzoyloxy)-ethyl]-9-pyrid[3.4-b]indolium bromide.

7. 1 - (lower)alkyl - 2 - [3 - (3,4,5-trimethoxybenzoyloxy)propyl]-9-pyrid[3.4-b]indolium bromide.

8. 1 - heptyl - 2 - [3 - (3,4,5 - trimethoxybenzoyloxy)-propyl] - 9 - pyrid[3.4-b]indolium bromide.

9. A compound of the structural formula

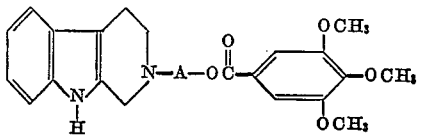

wherein A is a lower alkylene radical separating the groups attached thereto by at least 2 carbon atoms.

10. 1,2,3,4 - tetrahydro - 2 - [3 - (3,4,5 - trimethoxybenzoyloxy)propyl]-9-pyrid[3.4-b]indole.

11. A compound of the structural formula

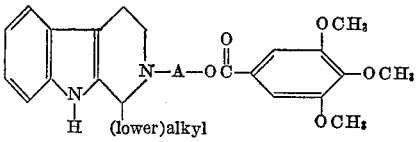

wherein A is a lower alkylene radical separating the groups attached thereto by at least 2 carbon atoms.

12. 1,2,3,4 - tetrahydro - 1 - methyl - 2 - [3 - (3,4,5-trimethoxybenzoyloxy)propyl]-9-pyrid[3.4-b]indole.

References Cited in the file of this patent

Schlittler, et. al.: Chem. Abstracts, vol. 49, col. 6974 (1955).